3,304,532
SIDE-LOOKING SONAR SYSTEM
Arthur Nelkin, Pittsburgh, and Dale D. Skinner, Turtle Creek, Pa., assignors to Westinghouse Electric Corporation, Pittsburgh, Pa., a corporation of Pennsylvania
Filed Apr. 16, 1965, Ser. No. 448,775
13 Claims. (Cl. 340—3)

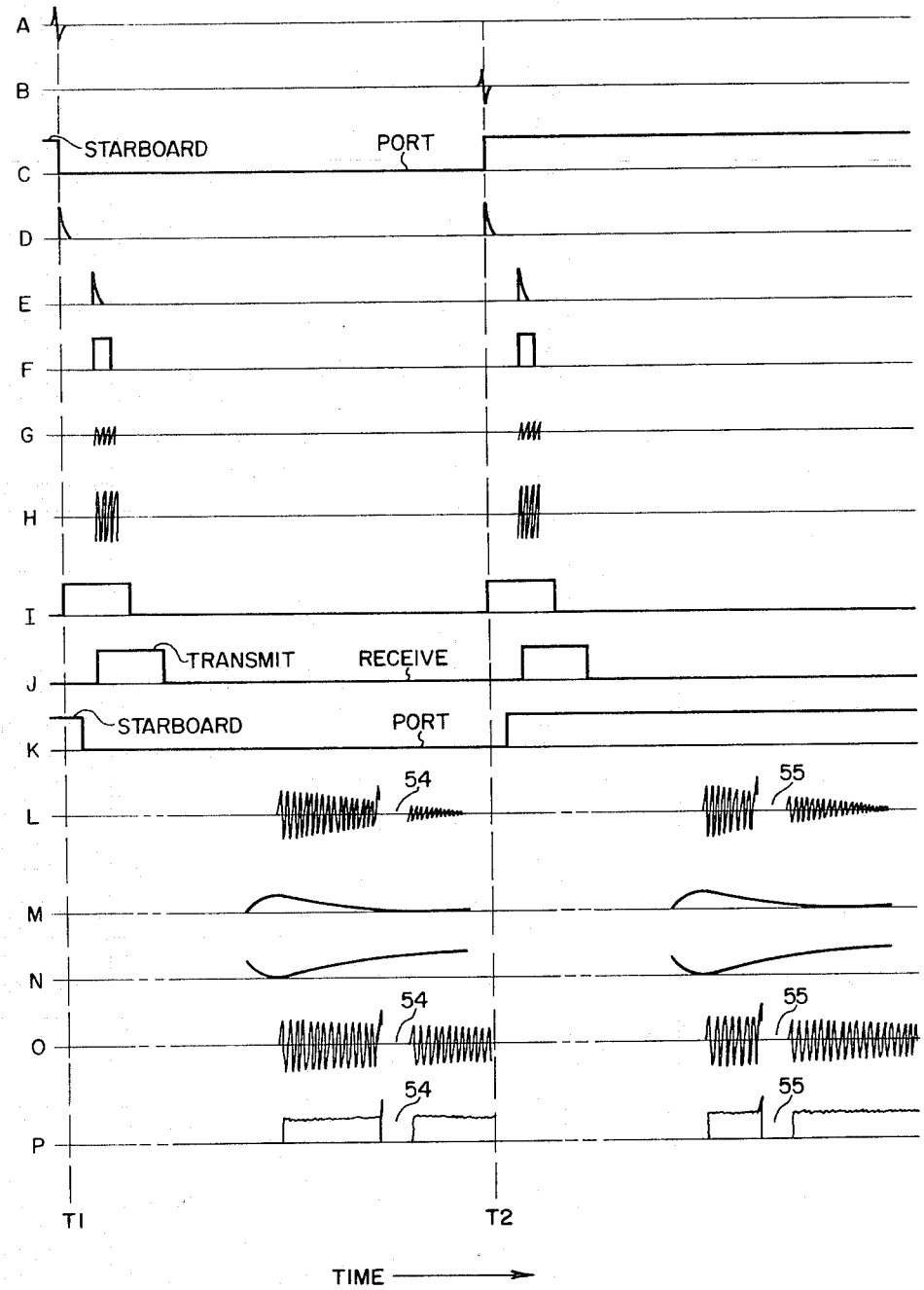

This invention, in general, relates to sonar systems, and in particular to a side-looking sonar system for examining underwater terrain, or the like which is operable in a long range mode encompassing a relatively large area and is additionally operable in a high resolution mode over a relatively small area.

In side-looking sonar systems, an elongated transducer is generally mounted on the port and starboard side of a carrier vehicle which travels along a course line. Acoustic energy is propagated in a very narrow fan-shaped beam pattern to either side of the vehicle by the transducer and energy reflected from the bottom or objects on the bottom is picked up by the same or a similar receive transducer. As the carrier vehicle continues along its course line an indicating apparatus, such as a storage tube or paper recorder, portrays a picture of the bottom in accordance with each reflected transmitted signal. The recorded picture is analogous to a picture on a television set in that the entire picture is made up of a plurality of parallel lines, with each line in the case of the side-looking sonar, being the result of a reflected transmitted signal.

A long range side-looking sonar transducer is generally a straight line transducer wherein the length may be in the order of several feet and the carrier vehicle is in the order of 200 feet above the ocean bottom. Generally the length of the transducer is much greater than 10 times the wavelength of the operating frequency. Another type of side-looking sonar transducer has been developed wherein the transducer is of a curved elongated configuration. The curved transducer is utilized for high resolution work where the carrier vehicle is a short distance, for example 20 feet above the ocean bottom and wherein the lateral range is reduced. This type of high resolution sonar generally operates at a higher frequency than the long range sonar.

For either the long range transducers or the high resolution transducers, there is generally provided two different operating frequencis with two complete receiver units tuned to these frequencies in order that the signal transmitted by the starboard transducer is not received by the port transducer and vice versa. If both the long range mode of operation and the high resolution range of operation is desired, duplicate sets of equipment are provided. The provision of independent electronic systems for port and starboard and the long range and high resolution modes of operation is not objectionable where adequate space is provided, such as for example on board a surface ship. With the increasing interest in oceanographic studies, various underwater submersibles have been designed. Since room on such submersibles is at a premium, provision of a plurality of sets of electronic equipment is highly undesirable. Additionally where the long range mode and high resolution mode of operation is desired in a system embodying a towed vehicle, space is also at a premium.

It is therefore an object of the present invention to provide a sonar system having both long range and high resolution modes of operation in which duplicate sets of equipment have been eliminated.

Another object is to provide a side-looking sonar system of the type described wherein the port and starboard transducers operate at the same frequency.

Another object is to provide a side-looking sonar system of the type described which utilizes a single oscillator for providing an output signal.

Briefly, in accordance with the above objects, there is provided vehicle carried port and starboard long range side-looking sonar transducer means in addition to high resolution side-looking sonar transducer means. In order to select either the long range or high resolution mode of operation, a mode switch means is provided and is operable in a first or second state of operation corresponding to the long range mode and high resolution mode respectively. The mode switch means is additionally operable to control the duration of the output pulse provided by a gated oscillator circuit. Once the desired transducers (long range or high resolution) have been selected, an output pulse is gated to the selected port transducer which in turn transmits an acoustic signal to the surrounding medium. The acoustic signal impinges upon the ocean (river, estuary, etc.) floor along a very narrow strip laterally of the carrier vehicle. The reflected acoustic signal is picked up by the port transducer which, in a well-known manner, provides an echo signal (electrical) in accordance with the reflected acoustic signal, and this echo signal is fed to a port recorder. An output pulse is then transmitted from the selected transducer of the starboard side, a reflected signal is received and fed to the starboard recorder after which the sequence is again continued.

A source of sync signals is provided to control transmission and the reception from the port and starboard sides of the vehicle. These sync signals are utilized for generating sequentially occurring port and starboard signals with each port and starboard signal being utilized to generate a transmit-period signal and a subsequent receive period signal to a transmit-receive switch or the like. For each port and starboard signal an output pulse is fed to a selected transducer, during a transmit period and a reflected or echo signal is fed to an associated recorder, (port or starboard) during a receive period.

If mechanical switches are utilized, the system may include a transmitter lock-out circuit which will prevent the oscillator from providing an output signal when switching from a long range to a high resolution mode of operation and vice versa. This will prevent the oscillator from providing an output signal to a switch in the process of switching which, if the signal were present, would cause the switch contacts to arc and burn out. Time varying gain circuits may be provided to compensate for predictable variations in the echo signal in order to provide the receivers with signals that have a smaller dynamic range. Since a variation in the return signal operating in the long range mode is different from a return signal operating in the high resolution mode, the time varying gain circuits utilizing may be responsive to the state of operation of the mode switch in order to provide the proper time varying gain signals.

The above stated as well as further objects and advantages of the present invention will become apparent upon a reading of the following detailed specification taken in conjunction with the drawings in which:

FIG. 5 illustrates various waveforms to aid in an understanding of the present invention.

Figure 1:
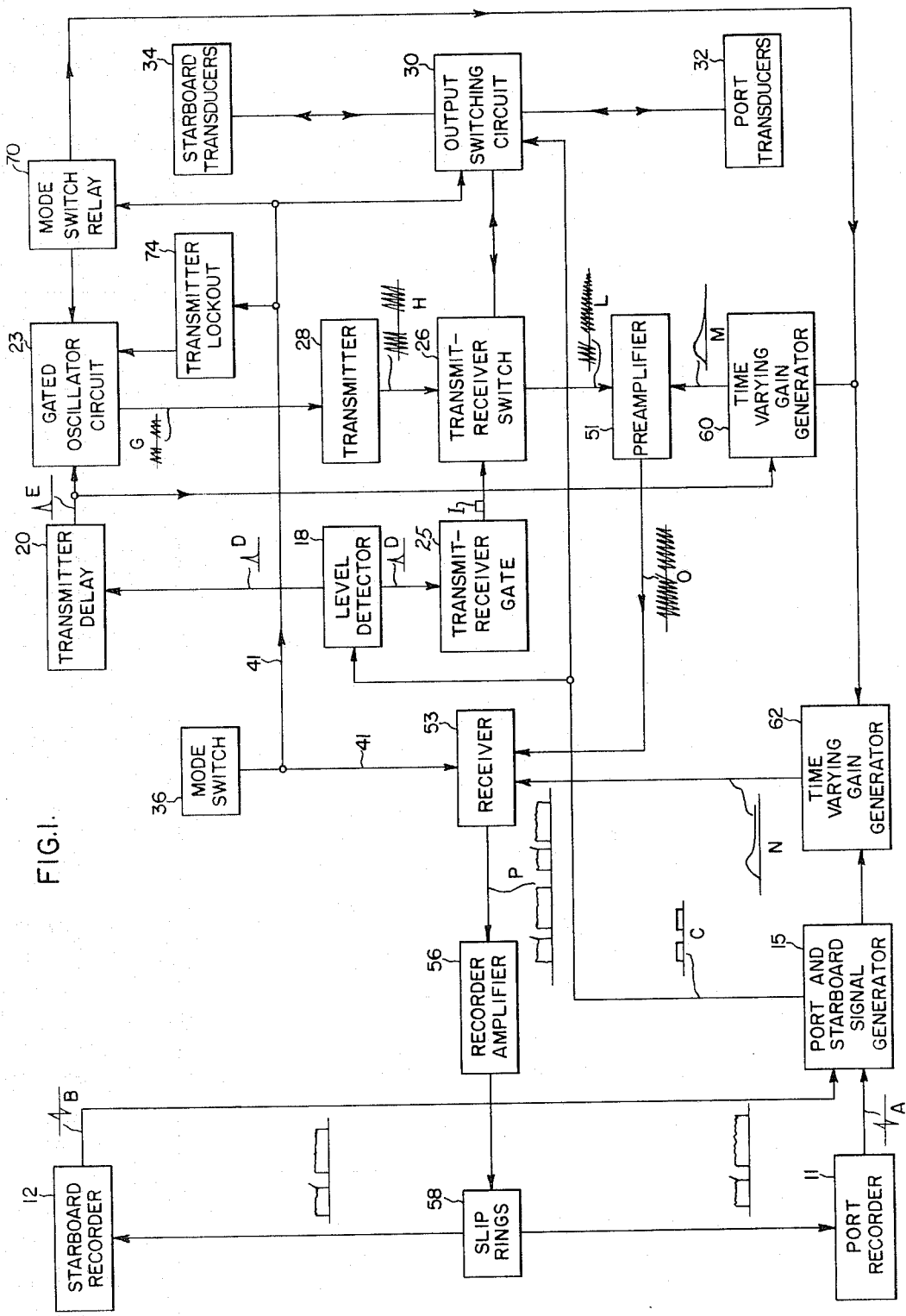
FIGURE 1 illustrates an embodiment of the present invention.

The embodiment of the invention illustrated in FIG. 1 includes as a recording means, port recorder 11 and starboard recorder 12. The recorders may be of a type which includes a wire helix mounted on a revolving drum, over which passes a chemically treated paper. Signal currents reflected from the ocean bottom are conducted by each helix which starts a chemical reaction depositing ions from the helix onto the paper thereby changing its color. For each echo signal received, there is a corresponding line on the chemically treated paper, which line varies in intensity in accordance with the return signal. As successive lines are recorded on the paper due to successive echo signals, a composite picture, within a selected range of the ocean bottom is developed on the paper.

In operation, a narrow pulse of acoustic energy is propagated to the surrounding medium by a selected port transducer during a transmit period, the port transducer then provides an echo signal in response to the reflected acoustic signal, during a subsequent receive period, and the echo signal is recorded in the port recorder. Thereafter the same sequence is initiated with respect to the starboard transducer and recorder. This operation is a time-sharing sequence and in order to initiate the port operation comprising the sending, receiving and recording of information from the port transducer and then the starboard operation including the sending, receiving and recording from the starboard transducer, there is provided a source of sync signals which conveniently may be provided by the port and starboard recorders respectively. The frequency of occurrence of these sync signals depends upon which of the transducers, that is the long range or high resolution transducers are being utilized. Typical parameters for the system described will be given hereinafter, however, with respect to the frequency of sync signals a typical frequency of occurrence might be two pulses per second (one pulse per second each side) in the long range mode and twelve pulses per second (six pulses per second each side) in the high resolution mode. For these different modes of operation the recorder's helix has a corresponding difference in speed of rotation. Such recorders are well known to those skilled in the art. Other types of recording means such as magnetic tapes or cathode ray storage tubes (having different scan speeds) could obviously be utilized with the sync signals being provided by clock pulses on the tape, by the cathode ray storage tube circuit or by independent means.

A better understanding of the operation of the circuit of FIG. 1 may be had by referring from time to time to the waveforms of FIG. 5. Waveform A shows a sync pulse provided by the port recorder 11, at time T1 and waveform B shows a sync signal provided by the starboard recorder 12 at time T2. In the long range mode of operation the time from T1 to T2 of a typical system described herein is in the order of 500 milliseconds and for the high resolution mode is in the order of 83 milliseconds. The vertical voltage scale of each waveform is not necessarily the same as the other waveforms; waveforms J and K merely represent states of operation rather than voltage. Since the embodiment of the invention to be described utilizes mechanical circuitry in part, mechanical delays have been reflected in the waveforms of FIG. 5; electrical delays have been neglected.

Means in the form of port/starboard signal generator 15 is responsive to the sync signals for providing sequentially occurring port and starboard signals illustrated in FIG. 5 as waveform C. The port/starboard signal generator 15 may be a bistable multivibrator, the low voltage output of which may be the port signal and the high voltage output of which may be the starboard signal. Alternatively, the port and starboard signals may be produced independently of the sync signals if a properly timed port/starboard signal generator is provided. As seen in FIG. 5 the port signal is at zero volts from time T1 to T2 and the starboard signal is at, for example, 20 volts for a corresponding period of time starting at T2. These bivalued port and starboard signals are sequentially provided and eventually control the transmission of an output signal as well as other circuit functions, as will become apparent.

In order to positively define times T1, T2 ... etc., port and starboard signals are fed to the level detector 18 which provides positive pulses, shown in waveform D of FIG. 5, each time that a port signal changes to a starboard signal and vice versa. Each successive pulse provided by the level detector therefor represents the occurrence of either a port or starboard signal. The level detector may in its simplest form be a differentiation network with a suitable inverting amplifier. The level detector output is fed to a delay 20, the output of which is illustrated as waveform E of FIG. 5, and is utilized to trigger the gated oscillator circuit 23. Several of the switching circuits to be described herein are illustrated as mechanical relays. Since mechanical relays have a slight time delay for example, in the order of a couple of milliseconds, it is necessary to insert a corresponding delay circuit 20 in order to have the transmit-receive switch, to be described, in a transmit position when an output signal is being transmitted. For an all electronic circuit, the delay 20 would not be needed.

The output of the level detector 18 is also fed to the transmit-receive gate 25 which is operable to provide the transmit-receive switch 26 with a transmit period signal and a receive period signal defining a transmit mode of operation and a subsequent receive mode of operation. The transmit-receive gate 25 may be a monostable multivibrator providing an output waveform illustrated as waveform I in FIG. 5. From the waveforms of FIG. 5, it can be seen that each occurrence of a port or starboard signal results in the transmit-receive gate 25 providing a transmit period and receive period signal. The transmit and receive mode of operation of the transmit receive switch 26 is illustrated as waveform J of FIG. 5 with the time displacement from waveform I being due to a mechanical time delay of a couple of milliseconds.

The gated oscillator circuit 23 is responsive to each pulse from the delay circuit 20 to provide output signals in the form of short bursts of energy which are amplified in the transmitter 28, and fed to the transducers through the transmit-receive switch 26. The gated oscillator circuit output and the transmitter output are illustrated in waveforms G and H respectively of FIG. 5. The width of the output pulse signal is dependent upon which mode of operation, that is the long range or high resolution mode of operation is desired. For a system operating at a frequency of 225 kilocycles, the pulse width for a high resolution mode of operation may be in the order of .25 millisecond and in the long range mode, 4 times that, or in the order of 1 millisecond.

Figure 3:
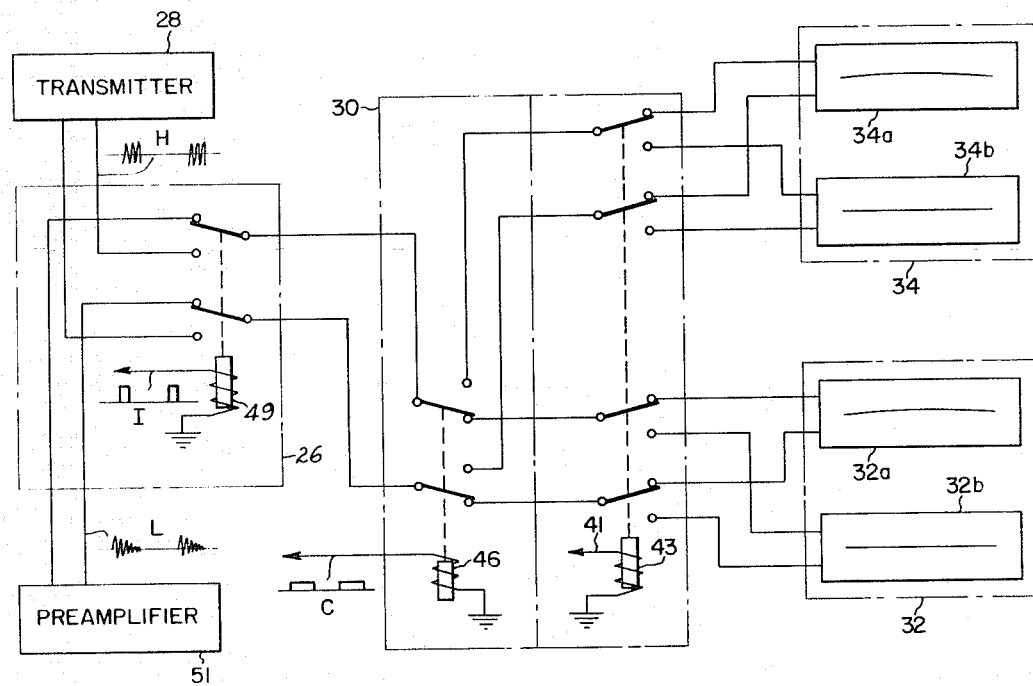

The port signal (C of FIG. 5) causes the transmit-receive switch 26 to be in a transmit position for gating the output signal provided by the gated oscillator circuit 23. The output switching circuit 30 is also responsive to the port and starboard signals for gating the output signals to the respective port and starboard transducer means 32 and 34 respectively. To reiterate, the port signal at time T1 initiates an output pulse and causes the transmit-receive switch 26 to gate the output pulse when it is in a transmit position. The port signal is fed to the output switching circuit so that the output pulse is sent to a selected one of the port transducer means 32 (FIG. 3). The port transducer means sends out a narrow acoustic fan-shape beam which impinges upon the ocean bottom in a very narrow strip. The reflected acoustic signal is returned to the port transducer means 32 which then provides an echo signal which is conducted back through the output switching circuit 30, to the transmit-receive switch 26, which at the time of reception of the echo signal is in a receive position. The echo signal is illustrated in waveform L. The time axis in waveform L is broken to bring out the fact that the echo is received from the bottom at approximately 80 milliseconds after a pulse is transmitted in the long range mode of operation and approximately 8 milliseconds after a pulse is transmitted in the high resolution mode of operation. During the time that the transmit-receive switch 26 is in the receive position and up to time T2, the return signal is processed and recorded, as will be explained. After time T2, and during the occurrence of the starboard signal, the output switching circuit 30 will gate the output signal passed through the transmit-receive switch 26, in its transmit position, to the starboard transducer means 34, after which an echo signal will be gated by the transmit-receive switch 26 in its receive position, to circuitry wherein the echo signal is processed and recorded.

Figure 2:
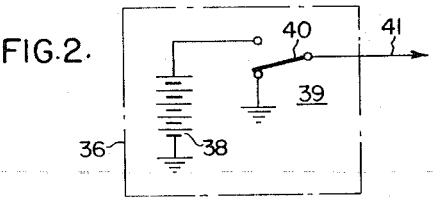
FIGS. 2, 3 and 4 illustrate in somewhat more detail various portions of the circuit illustrated in FIG. 1.

In order to choose which transducers transmit the output signal, that is, either the long range or high resolution transducers, there is provided a mode switch means which is operable in a first or second state of operation corresponding to the long range mode and high resolution mode of operation respectively. The mode switch 36 is shown in more detail in FIG. 2 and in its basic form may include a voltage source in the form of battery 38 and a switch 39. In one position the contact arm 40 of the switch 39 is connected to ground and consequently there is zero potential on line 41. This zero potential may correspond to the high resolution mode of operation. With the contact arm 40 of the switch 39 connected to the battery 38, there is a voltage on line 41 and this condition represents the long range mode of operation.

FIG. 3 illustrates in somewhat more detail a possible arrangement of the transmit-receive switch 26, the output switching circuit 30, and the various transducer means. The port transducer means 32 and the starboard transducer means 34 is seen to include a high resolution transducer 32a and 34a respectively, and a long range transducer 32b and 34b respectively. One type of a long range transducer 32b or 34b is more fully described and claimed in application Serial No. 379,111 filed June 30, 1964, by F. G. Geil et al., and assigned to the assignee of the present application. Although four separate transducers 32a, 32b, 34a and 34b are illustrated, it is sometimes more convenient to mount both the long range and high resolution transducer in a single container with one container being on the port side and another container being on the starboard side of the carrying vehicle.

The output switching circuit 30 includes a mode switch relay 43 connected by way of line 41 to the mode switch 36 (FIG. 1). With no voltage on line 41 the mode switch relay 43 is in a deenergized state and the relay contacts are in the position shown, with electrical connection being made to the high resolution transducers 32a and 34a. When the mode switch 36 (FIG. 1) is in its other state of operation, there is a voltage on line 41 which causes activation of the mode switch relay 43 and the relay contacts are pulled down to make electrical connection with the long range transducers 32b and 34b.

The output switching circuit 30 also includes a time-share relay 46 which is energized from the port/starboard signal generator 15 and is responsive to the signal provided thereby (waveform C, FIG. 5). The contacts of relay 46 are shown in their rest position with the relay deenergized representing the period from time T1 to T2 in FIG. 5, during which time a complete port operation takes place. Since the time-share relay 46 is a mechanical device there will be a slight delay involved in switching and the resulting operation is illustrated in the waveform K of FIG. 5. At time T2 when the signal to time-share relay 46 goes high, the relay contacts will move to their other position for a complete starboard operation.

The transmit-receive switch 26 includes a transmit-receive relay 49 which is energized by the signal provided by the transmit-receive gate 25 (FIG. 1). Waveform I of FIG. 5 shows the voltage applied to the transmit-receive relay and it is seen that at time T1 when a high voltage is applied to the relay 49, the relay contacts will be pulled down so that the transmitter 28 passes the output signal through the transmit-receive switch 26 to a selected one of the transducers 32a or 32b or 34a or 34b. When waveform I goes to zero, the transmit-receive relay 26 is deenergized and the contacts resume their normal position as illustrated in FIG. 3 so that any echo signal provided by the selected transducer may be gated through to the preamplifier 51. After the signal has been processed and recorded, the time-share relay 46 is energized at time T2 and the cycle is repeated for the selected starboard transducer.

Referring back to FIG. 1, means are provided to process and gate the echo signals provided by the port and starboard transducers, to the respective port and starboard recorders 11 and 12. As was stated, the electrical output signal provided by the gated oscillator circuit 23 (through transmitter 28) is fed to the transducer means which converts the electrical signal to an acoustic signal. The acoustic signal impinges upon the ocean bottom in a very narrow strip and reflects back to the transducer. The reflection from the ocean bottom close to the carrier vehicle arrives initially and returns from points further out along the strip arrive progressively thereafter. These subsequent returns are not as strong as the initial return and consequently the total acoustic signal reflected back to the transducer has an initial value which progressively decreases. The transducer converts the reflected acoustic signal back into an electrical signal representing the narrow strip of ocean bottom upon which the transmitted acoustic signal impinged. This electric signal produced by the transducer in response to the reflected transmitted signal is herein termed echo signal. Any object on the ocean bottom lying in the path of the acoustic signal will have the effect of shielding a portion of the bottom from the acoustic signal. That portion of the bottom will lie in an acoustic shadow. Typical port and starboard echo signals are illustrated in waveform L of FIG. 5, with each having an absence of signal portion, 54 and 55, representing an acoustic shadow. Just prior to portions 54 and 55, the echo signal increases. The increase is due to the stronger return from the object.

The echo signals are gated by the transmit-receive switch 26 to the preamplifier 51 after which information is extracted from the echo signals in the receiver 53. The receiver output is fed to the recorder amplifier 56, the output signal of which includes both starboard and port information. In order to direct the starboard information to the starboard recorder and the port information to the port recorder, a slip ring arrangement 58 is provided, although it is obvious that other types of gating arrangements could be utilized.

In order to compensate for predictable amplitude variations of the return signal, there is provided a first time varying gain generator 60 which provides a time varying gain signal to the preamplifier 51 of the variable gain variety. To further compensate for these undesired variations, a second time varying generator 62 is provided and supplies a time varying gain signal to the receiver 53, also of the variable gain variety so that the output signal therefrom represents the contour of the ocean bottom (and sufficiently sized objects thereon)

without any decrease in intensity due to the progressively weaker signal reflected from the ocean bottom further out along the strip. The time varying gain generator 60 operates in a well known manner to provide a time varying gain signal illustrated as waveform M in FIG. 5. The time varying gain generator 60 generally includes a capacitor which charges up to a certain value. The increasing portion of the waveform M represents this charge-up period and the decreasing portion of the waveform M is caused by the capacitor discharging through a resistor. The time varying gain signal (waveform M) fed to the variable gain preamplifier 51 serves to vary the gain thereof as illustrated in waveform N of FIG. 5. It is seen that when the echo signal (waveform L) is received, the gain of the preamplifier is very low and as the decreasing echo signal is received, the gain of the preamplifier increases accordingly so that the preamplified signal takes on a shape such as illustrated as waveform O in FIG. 5. The waveform O continues to have a slight taper, however this may be eliminated by a similar operation with respect to the time varying gain generator 62 acting on the variable gain receiver 53 which provides the video output signal illustrated in waveform P.

Figure 4:
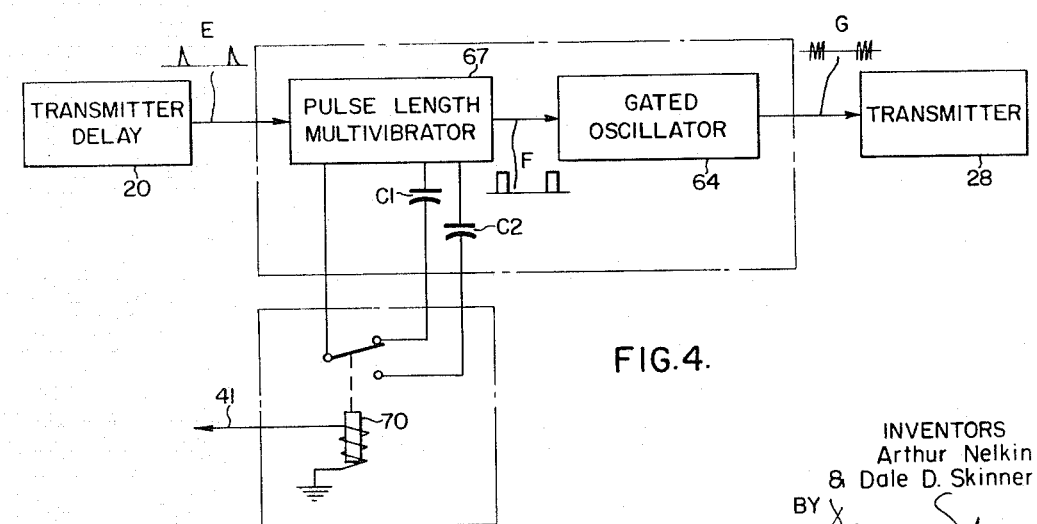

It has been stated that when the system is in the long range mode of operation, the pulse width of the output signal (waveform H, FIG. 5) is in the order of 1 millisecond, and when the system is operating in the high resolution mode of operation, the pulse width of output signal is in the order of .25 millisecond. Since the pulse width is a function of the desired mode of operation, the gated oscillator circuit 23 is operable to provide the desired pulse width in accordance with the state of operation at the mode switch 36. FIG. 4 illustrates one way in which this can be done. The gated oscillator circuit 23 is shown in somewhat more detail than illustrated in FIG. 1 and it is seen to include a gated oscillator 64 which is turned on and off in response to a signal from the pulse length multivibrator 67. The mode switch relay 70 is connected by line 41 to the mode switch 36 so that when the voltage on line 41 is zero volts indicating a first mode of operation, the relay contact will cause capacitor $C_1$ to be placed in the pulse length multivibrator circuit. When the voltage on line 41 goes high, the mode switch relay moves the contact arm such that capacitor $C_2$ is placed into the pulse length multivibrator circuit 67. Capacitors $C_1$ and $C_2$ have different values chosen such that with $C_1$ in the circuit the output pulse width is one millisecond and with $C_2$ connected in the circuit, the output pulse width is .25 millisecond.

In a manner similar to the changing of capacitors illustrated in FIG. 4, the mode switch relay 70 may be additionally operable to switch capacitors in the time varying gain generators 60 and 62 to provide two different time varying gain signals for the long range mode of operation and the high resolution mode of operation.

If the mode switch 36 changes from one state to its opposite state of operation, the mode switch relay 43 of FIG. 3 will cause its contact arms to switch from the high resolution transducers to the long range transducers or vice versa. If an output signal should accidentally be transmitted as the contact arms are switching, the output signal which might have a peak-to-peak voltage of approximately 600 volts could cause possible damage to the contacts. In order to prevent a signal from being transmitted when the mode of operation is being switched, there is provided a transmitter lockout circuit 74 which senses the switching of states of operation of the mode switch 36 and will provide a blocking signal to the gated oscillator circuit 23 to prevent an output signal from being provided. Once the mode of operation has been switched, the blocking signal is removed. The mode switch 36 may additionally be operable to vary the amplifying characteristics of the receiver 53 so as to properly extract information from echo signals in the long range or high resolution mode.

Where space is at a premium on the transducer carrying vehicle, various ones of the components illustrated in FIG. 1 may be mounted in outboard pressure housings. In situations where space is not at a premum, the mode switch relays may be eliminated simply by providing manually operated switch or switches. For systems where the transducers and electronics are mounted on a towed vehicle, signals to and from the transducers may be relayed by means of a multiwire cable or alternatively a single wire cable may be utilized with suitable and well-known multiplexing arrangements.

Although various operating data have been set forth previously, the following chart is a more complete summary of a typical operative system according to the teachings of the present invention.

| Transducer type | High resolution mode | Long range mode |
| --- | --- | --- |
| Operating frequency | 225 kc | 225 kc. |
| Transducer length | 45 inches | 45 inches. |
| Sync pulse repetition rate | 12-0 pulses/sec.; 6-0 pulses/sec. each side. | 2 pulses/sec.; 1 pulse/sec. each side. |
| Approximate transducer altitude | 20 ft | 225 ft. |
| Range each side of carrier vehicle | 225 ft | 1,250 ft. |
| Pulse width | 0.25 ms | 1 ms. |
| Resolution: | | |
| Width of beam impinging on bottom | 1.1 ft. at 225 ft | 6.6 ft. at 1,250 ft. |
| Athwartship (lateral) | 7.5 inches | 2.5 ft. |
| Recorder type: Paper recorder w/wire helix mounted on drum —helix speed. | 360 r.p.m | 60 r.p.m. |

Although the invention has been described with a certain degree of particularity, it should be understood that various modifications may be made without departing from the spirit and scope of the invention.

We claim as our invention:
1. A sonar system comprising:
  (a) vehicle carried port and starboard long range sidelooking sonar transducer means;
  (b) vehicle carried port and starboard high resolution side-looking sonar transducer means;
  (c) means for providing sequentially occurring port and starboard signals;
  (d) oscillator means for providing a limited pulse width output signal for each said port signal produced and each said starboard signal produced;
  (e) amplifier and recording means;
  (f) circuit means operable, during the period in which a port signal is provided,
    (1) to gate the output signal to a selected one of said port transducer means, whereupon said port transducer means transmits an acoustic signal to the surrounding medium and provides an echo signal upon receipt of any reflected acoustic signal, and
    (2) to gate the echo signal to said amplifier and recording means;
  (g) said circuit means being additionally operable during the period in which a starboard signal is provided,
    (1) to gate the output signal to a selected one of said starboard transducer means, whereupon said starboard transducer means transmits an acoustic signal to the surrounding medium and provides an echo signal upon receipt of any reflected acoustic signal, and
    (2) to gate the echo signal to said amplifier and recording means.
2. A sonar system comprising:
  (a) vehicle carried port and starboard long range sidelooking sonar transducer means;
  (b) vehicle carried port and starboard high resolution side-looking sonar transducer means;

(c) a source of sync signals;
(d) means responsive to said sync signals for providing sequentially occurring port and starboard signals;
(e) oscillator means for providing a limited pulse width output signal for each said port signal produced and each said starboard signal produced;
(f) amplifier means;
(g) port and starboard recording means;
(h) circuit means operable, during the period in which a port signal is provided,
   (1) to gate the output signal to a selected one of said port transducer means, whereupon said port transducer means transmits an acoustic signal to the surrounding medium and provides an echo signal upon receipt of any reflected acoustic signal, and
   (2) to gate the echo signal provided by said port transducer means to said amplifier and said port recording means;
(i) said circuit means being additionally operable during the period in which a starboard signal is provided,
   (1) to gate the output signal to a selected one of said starboard transducer means, whereupon said starboard transducer means transmits an acoustic signal to the surrounding medium and provides an echo signal upon receipt of any reflected acoustic signal, and
   (2) to gate the echo signal provided by said starboard transducer means to said amplifier and said starboard recording means.

3. A sonar system according to claim 2 in which the sync signals are alternatively provided by the port and starboard recording means.

4. A sonar system comprising:
(a) vehicle carried port and starboard long range side-looking sonar transducer means;
(b) vehicle carried port and starboard high resolution side-looking sonar transducer means;
(c) a source of sync signals;
(d) means responsive to said sync signals for providing sequentially occurring port and starboard signals;
(e) oscillator means for providing a pulse output signal of predetermined width in response to the individual occurrence of said port and starboard signals;
(f) means for gating output signals to a selected one of said high resolution or long range transducer means;
(g) output switching means responsive to said port and starboard signals for gating successive output signals to alternate port and starboard transducer means respectively;
(h) said transducer means being operable upon receipt of said output signal to transmit an acoustic signal to the surrounding medium and being operable thereafter for providing an echo signal upon receipt of any reflected acoustic signal;
(i) amplifier means;
(j) gating means for gating said output signals to said transducer means and said echo signals to said amplifier means and preventing interaction of said output signal with said amplifier means and said echo signal with said oscillator means; and
(k) port and starboard recorder means connected to said amplifier means for recording echo signals provided by said port and starboard transducer means respectively.

5. A sonar system comprising:
(a) vehicle carried port and starboard long range side-looking sonar transducer means;
(b) vehicle carried port and starboard high resolution side-looking sonar transducer means;
(c) a source of sync signals;
(d) means responsive to said sync signals for providing sequentially occurring port and starboard signals;
(e) oscillator means for providing a pulse output signal of predetermined width in response to the individual occurrence of said port and starboard signals;
(f) a transmit-receive switch operable in both a transmit mode and a subsequent receive mode for each said port and for each said starboard signal provided, and connected to said oscillator means for passing said output signal when said switch is in a transmit mode;
(g) means for gating output signals to a selected one of said high resolution or long range transducer means;
(h) output switching means responsive to said port and starboard signals for gating successive output signals to alternate port and starboard transducer means respectively;
(i) said transducer means being operable upon receipt of said output signal to transmit an acoustic signal to the surrounding medium and being operable thereafter for providing an echo signal upon receipt of any reflected acoustic signal, said echo signal being applied to said transmit-receive switch when said switch is in its receive mode;
(j) amplifier means connected to said transmit-receive switch for amplifying said echo signal during the period when said transmit-receive switch is in its receive mode; and
(k) port and starboard recorder means connected to said amplifier means for recording echo signals provided by said port and starboard transducer means respectively.

6. A sonar system comprising:
(a) vehicle carried port and starboard long range side-looking sonar transducer means;
(b) vehicle carried port and starboard high resolution side-looking sonar transducer means;
(c) a source of sync signals;
(d) means responsive to said sync signals for providing sequentially occurring port and starboard signals;
(e) oscillator means for providing a pulse output signal for each said port signal produced and for each said starboard signal produced;
(f) amplifying and recording means;
(g) circuit means operable, during the period in which a port signal is provided,
   (1) to gate the output signal to a selected one of said port transducer means, whereupon said port transducer means transmits an acoustic signal to the surrounding medium and provides an echo signal upon receipt of any reflected acoustic signal, and
   (2) to gate the echo signal to said amplifier and recording means;
(h) said circuit means being additionally operable during the period in which a starboard signal is provided,
   (1) to gate the output signal to a selected one of said starboard transducer means, whereupon said starboard transducer means transmits an acoustic signal to the surrounding medium and provides an echo signal upon receipt of any reflected acoustic signal, and
   (2) to gate the echo signal to said amplifier and recording means; and
(i) mode switch means for selecting which one of said long range or high resolution transducer means receive said output signals and for controlling the width of the pulse output signals.

7. A sonar system comprising:
(a) vehicle carried port and starboard long range side-looking sonar transducer means;

(b) vehicle carried port and starboard high resolution side-looking sonar transducer means;
(c) a source of sync signals;
(d) means responsive to said sync signals for providing sequentially occurring port and starboard signals;
(e) oscillator means for providing a pulse output signal for each said port signal produced and for each said starboard signal produced;
(f) mode switch means operable in a first or second state of operation corresponding to a long range mode and high resolution mode of operation respectively;
(g) gated oscillator means for providing an output signal;
(h) circuit means responsive to the state of operation of said mode switch for controlling the duration of said output signal provided by said gated oscillator means;
(i) amplifier means;
(j) said transducer means being operable upon receipt of said output signal to transmit an acoustic signal to the surrounding medium and being operable thereafter for providing an echo signal upon receipt of any reflected acoustic signal;
(k) circuit means for
  (1) gating said output signal to a selected one of said port transducer means and for subsequently gating an echo signal provided thereby to said amplifier means, during the occurrence of said port signal, and
  (2) gating said output signal to a selected one of said starboard transducer means and for subsequently gating an echo signal provided thereby to said amplifier means during the occurrence of said starboard signal; and
(l) port and starboard recorders responsive to the output of said amplifier means for recording said echo signals.

8. A sonar system according to claim 7 which includes circuit means responsive to the state of operation of the mode switch means for directing the output signal to selected ones of the long range transducer means or high resolution transducer means.

9. A sonar system comprising:
(a) vehicle carried port and starboard long range side-looking sonar transducer means;
(b) vehicle carried port and starboard high resolution side-looking sonar transducer means;
(c) a source of sync signals;
(d) means responsive to said sync signals for providing sequentially occurring port and starboard signals;
(e) oscillator means for providing a limited pulse width output signal for each said port signal produced and each said starboard signal produced;
(f) detection means for providing a signal each time a port signal is provided and each time a starboard signal is provided;
(g) a transmit-receive switch;
(h) a gating circuit responsive to each signal provided by said detection means for placing said transmit-receive switch in a transmit and a subsequent receive mode;
(i) said transmit-receive switch being connected to said oscillator means for passing said output signal to said transducer means during said transmit mode;
(j) circuit means connected to said transmit-receive switch for gating said passed output signal
  (1) to a selected one of said port transducer means when a port signal is provided, and
  (2) to a selected one of said starboard transducer means when a starboard signal is provided, whereupon said transducer means will transmit an acoustic signal to the surrounding medium and will provide an echo signal upon receipt of any reflected acoustic signal;
(k) amplifier means;
(l) said transmit-receive switch being connected to said amplifier means for passing said echo signals to said amplifier means during said receive mode; and
(m) means for recording the echo signals amplified by said amplifying means.

10. A sonar system comprising:
(a) vehicle carried port and starboard long range side-looking sonar transducer means;
(b) vehicle carried port and starboard high resolution side-looking sonar transducer means;
(c) circuit means for placing a desired one of said long range or high resolution transducer means into operation;
(d) signal generator means for providing sequentially occurring port and starboard signals;
(e) gated oscillator means for providing, during the provision of a port signal and during the provision of a starboard signal,
  (1) a first duration pulse output signal if said long range transducer means are placed into operation and
  (2) a second duration pulse output signal if said high resolution transducer means are placed into operation;
(f) amplifier and recording means;
(g) circuit means operable, during the period in which a port signal is provided,
  (1) to gate the output signal to the selected one of said port transducer means, whereupon said port transducer means transmits an acoustic signal to the surrounding medium and provides an echo signal upon receipt of any reflected acoustic signal, and
  (2) to gate the echo signal to said amplifier and recording means;
(h) said circuit means being additionally operable during the period in which a starboard signal is provided,
  (1) to gate the output signal to a selected one of said starboard transducer means, whereupon said starboard transducer means transmits an acoustic signal to the surrounding medium and provides an echo signal upon receipt of any reflected acoustic signal, and
  (2) to gate the echo signal to said amplifier and recording means.

11. A sonar system according to claim 10 in which pulse width of the first duration pulse output signal is greater than the pulse width of the second duration pulse output pulse.

12. A sonar system according to claim 10 in which the pulse width of the first duration pulse output signal is approximately 4 times the pulse width of the second duration pulse output signal.

13. A sonar system comprising:
(a) vehicle carried port and starboard long range side-looking sonar transducer means;
(b) vehicle carried port and starboard high resolution side-looking sonar transducer means;
(c) means for providing sequentially occurring port and starboard signals;
(d) oscillator means for providing a limited pulse width output signal for each said port signal produced and each said starboard signal produced;
(e) amplifier and recording means;
(f) circuit means operable, during the period in which a port signal is provided,
  (1) to gate the output signal to a selected one of said port transducer means, whereupon said port transducer means transmits an acoustic signal to the surrounding medium and provides an echo signal upon receipt of any reflected acoustic signal, and
(2) to gate the echo signal to said amplifier and recording means;

(g) said circuit means being additionally operable during the period in which a starboard signal is provided,
(1) to gate the output signal to a selected one of said starboard transducer means, whereupon said starboard transducer means transmits an acoustic signal to the surrounding medium and provides an echo signal upon receipt of any reflected acoustic signal, and
(2) to gate the echo signal to said amplifier and recording means, (h) time varying gain generator means for supplying time varying gain signals to said amplifier means during the reception of said echo signals.

No references cited.

CHESTER L. JUSTUS, *Primary Examiner.*

RICHARD A. FARLEY, *Examiner.*